United States Patent [19]
Tateda

[11] 3,783,219
[45] Jan. 1, 1974

[54] AIR COOLED MICROWAVE COOKING OVEN AND DOOR

[75] Inventor: Koichi Tateda, Osaka, Japan

[73] Assignee: Sharp Kabushiki Kaisha, Osaka, Japan

[22] Filed: Nov. 8, 1971

[21] Appl. No.: 196,591

[30] Foreign Application Priority Data
Nov. 11, 1970  Japan............................ 45/100487
Nov. 11, 1970  Japan............................ 45/100489

[52] U.S. Cl.............................. 219/10.55, 126/198
[51] Int. Cl............................................ H05b 9/06
[58] Field of Search............. 126/21 A, 21 R, 39 C, 126/198, 273 R; 219/391, 10.55

[56] References Cited
UNITED STATES PATENTS

| | | |
|---|---|---|
| 2,438,035 | 3/1948 | Buhman et al................... 126/39 C |
| 2,525,614 | 10/1950 | Nelson et al..................... 126/21 A |
| 3,057,341 | 10/1962 | Perl................................. 126/21 R |
| 3,081,392 | 3/1963 | Warner.............................. 219/391 |
| 3,679,855 | 7/1972 | Blinzer............................ 219/10.55 |
| 3,681,557 | 8/1972 | Suzuki et al.................... 219/10.55 |
| 3,711,673 | 1/1973 | Takeda et al.................... 219/10.55 |
| 3,509,868 | 5/1970 | Mono................................. 126/198 |

*Primary Examiner*—Thomas J. Kozma
*Assistant Examiner*—Hugh D. Jaeger
*Attorney*—Flehr, Hohbach, Test, Albritton & Herbert

[57] ABSTRACT

In a microwave cooking apparatus, more particularly in an apparatus having a radiant heating means for surface browning of the foodstuff and the like, the interior of the door and the handle are heated at a relatively high temperature. A blower means for providing an air stream is so installed as to cool the interior of the door whereby prevents the temperature rise of the door and the handle due to the heat from the browning means and so forth.

4 Claims, 3 Drawing Figures

AIR COOLED MICROWAVE COOKING OVEN AND DOOR

BACKGROUND OF THE INVENTION

This invention relates to a cooking apparatus using electricity, gas, hot blast and the like as the heat source thereof, and more particularly to an improved cooking apparatus in which the cooling unit is provided to maintain the whole of the apparatus at a comparatively low temperature of safety.

The cooking apparatus, in general, use electricity, gas, hot blast and so forth as the energy source thereof. These energies are supplied to the interior of the oven compartment, wherein the foodstuff and the like absorb these energies and thereby the foodstuff is cooked. Since the oven walls and door walls generally consist of metal having good heat conductivity, these walls are heated at a considerably high temperature due to the heat from the energy source or the foodstuff when cooking is is progress. Therefore, in order to secure safety in entry and withdrawal of the foodstuff from the oven compartment, the handle-attached door as well as the oven walls must be kept at a relatively low temperature.

In conventional cooking apparatus, although the cooling unit for the oven walls is provided by establishing a passage for circulation of an air stream between the oven walls and the cabinet enclosing the oven walls, the cooling of the door is scarcely considered for various reasons. Examples of the cooling unit are disclosed in U.S. Pat. Nos. 3,081,392 and 3,339,054. The effective cooling of the door is essential for domestic use. In case of installing the cooling unit in or on the door which very often is moved to an open or a closed position, the door construction becomes complicated and much more expensive than previous designs and further is inconvenient for the opening and closing of the door. In the prior art the cooling of the door is attained by naturally cooling or filling the interior of the door with a heat isolator and accordingly the cooling power for the door is poor and the door will be dangerously heated to a considerably high temperature due to long, continuous use. In case of microwave oven wherein the foodstuff within the oven compartment is cooked by dielectric heating alone, metallic oven walls and door walls are heated a little due to the heat from the foodstuff and the like, but are not heated to such a degree that the operator might feel the heat around the door, and thus there is no particular necessity of the door cooling unit. On the contrary, in case of another microwave oven wherein a register type heater or a source of hot blast is provided to produce browning or to speed up the cooking, the radiant heat from the heater, hot air and fumes cause the oven walls and the door walls to be overheated. Of course, where such overheating becomes excessive, it causes damage to the operator in entering and withdrawing of the foodstuff into the oven compartment.

During the cooking process oil or the other exhalation from the foodstuff get scorched and stuck to the inner walls of the oven compartment and the door. In the case where the inner walls are overheated it is difficult to remove a stain on the inner walls therefrom. However, in the case where the wall surface is properly cooled at a low temperature a stain on the inner walls could be easily removed by merely wiping off with a piece of cloth after the cooling process.

OBJECTS AND SUMMARY OF THE INVENTION

Accordingly, the primary object of this invention is to provide an improved cooking apparatus wherein a forced-air cooling unit is adopted to cool effectively the interior of the door.

Another object of this invention is to provide an improved cooling apparatus which is provided with a cooling unit for making an air stream passing over the interior of the door circulating along the outer surface of the oven compartment thereby cooling the interior of the door and the exterior of the oven compartment.

Still another objct of this invention is to provide an improved cooling apparatus having a simple blower unit for simultaneously exhausting an air stream for cooling the door and an air stream for the interior of the oven compartment.

A further object of this invention is to provide an improved cooking apparatus having an effective cooling unit suitable for microwave oven wherein a resistor type heater or a source of hot blast is installed.

In summary, this invention refers primarily to improved cooling apparatus which comprises an enclosure having an access opening therein to receive an article or other foodstuff to be heated, a door fitted to said enclosure to freely open and close said access opening and means for cooling the interior of said door. A blower means for effectively cooling the door is designed to aspirate air from the surrounding ambience and to exhaust air passing over the interior of the door to the surrounding ambience. The door is provided with an outer wall having a plurality of apertures to permit the stream of air to be introduced into the interior of the door and with inner wall having another aperture to permit the stream of air to escape from the interior of the door. In a preferred example, a microwave cooking apparatus comprises a metallic oven having an access opening therein to receive foodstuff to be cooked, a metallic door fitted to said oven to freely open and close said access opening, means for supplying high frequency electromagnetic waves to the interior of said oven, browning means for surface browning of foodstuff and cooling means for sending air to the interior of said door and the exterior of said oven thereby preventing the temperature rise of said door and said oven due to the heat from said browning means.

Further details will be apparent from the following explanation of examples of embodiments of this invention with reference to the accompanying drawings.

DESCRIPTION OF THE PREFERRED EMBODIMENTS

Figure 1:
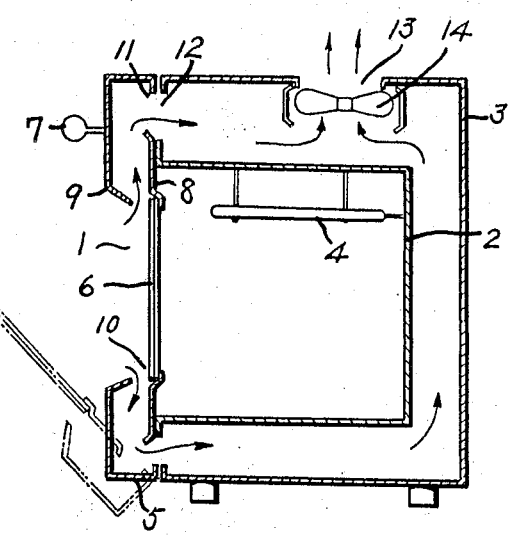
FIG. 1 is a sectional view in vertical section showing an oven structure of this invention.

Referring now to the drawings, in FIG. 1, it will be seen that reference character 1 indicates generally a cooking apparatus of the type disclosed in the aforementioned summary. The cooking apparatus 1 contains a metallic enclosure or oven compartment indicated by the numeral 2. The oven compartment 2 may comprise a rectangular chamber having a top wall, a bottom wall, a front wall, a rear wall and side walls. A cabinet 3, or the like, encloses the oven compartment 2 in spaced relation to provide passage for circulation of air stream against the oven compartment 2. The passage for air stream is established between the oven compartment 2 and the cabinet 3 to permit air stream to pass therethrough. A resistor type heater 4 as an energy source thereof is secured to the upper wall of the oven compartment 2 by a pair of rods extending through the upper wall and the foodstuff or the like is treated by the heater 4. A metallic door 5 is pivotally affixed on the front of the oven compartment 2 to freely open and close an access opening thereto, facilitating the entry and withdrawal of the foodstuff into the oven compartment 2. The door 5 further has at the center thereof a window 6 permitting visual inspection of the contents of the oven compartment 2 and the window 6 being covered with glass or the like secured to the door 5. A latch mechanism having a handle 7 maintains the door 5 in its upper or closed position.

In addition, it will be noted that the door 5 is a hollow frame having an inner wall 8 and an outer wall 9. One end of the outer wall 9 faces the periphery of the window 6 in spaced relation against the periphery to provide a first aperture 10 defining an inhale end for a passage of an air stream through the interior of the door 5. That is, the first aperture 10 is located around the entire periphery of the window 6. A portion of the inner wall 8 is cut to provide a second aperture 11 defining an exhaust end for the passage of an air stream through the door 5. The peripheral end of the front wall of the oven compartment 2 also is cut to provide a third aperture 12 between the front end of the oven compartment 2 and that of the cabinet 3. The third aperture 12 defines an inhale end for a passage of an air stream through the exterior of the oven compartment 2. The third aperture 12 is disposed in the front wall of the oven compartment 2 at a location corresponding to the second aperture 11 in the inner wall 8 of the door frame in its closed position and accordingly the passage of an air stream through the interior of the door 5 communicates with that through the exterior of the oven compartment 2. Moreover, the upper portion of the cabinet 3 is cut to provide a fourth aperture 13 defining an exhaust end for the passage of an air stream through the exterior of the oven compartment 2. A blower unit 14 having a motor and fan blades is provided near the fourth aperture or exhaust end 13.

In operation of the oven, the foodstuff is placed in the oven compartment 2 and is heated by the radiant heat from the resistor heater 4. During the cooking operation the blower unit 14 serves to simultaneously cool the interior of the door 5 and the exterior of the oven compartment 2. The first, second, third and fourth apertures 10, 11, 12, 13 are in the path of stream of air caused to flow by the blower unit 14. The air moved by the fan blades therefore flows into the door 5 through the aperture 10, and moves along the inside face of the door 5 and into the exterior of the oven compartment 2 through the aligned apertures 11 and 12. Cooling the interior of the door 5, the air stream is permitted to escape from the exterior of the oven compartment 2 through the aperture 13.

The abovementioned cooling means is an important feature of this invention and permits the interior of the door, as well as the exterior of the oven compartment, to cool simultaneously and thus prevents the walls of the door and the oven compartment and various electrical components positioned within the cabinet from being overheated. Thus, a safety feature is effected whereby injury is prevented to an operator. Furthermore, the cooling of the oven walls and the door is attained by a single blower, and more particularly the cooling of the door is attained only by hollow door construction having at least one pair of apertures defining the path of an air stream therethrough.

Figure 2:
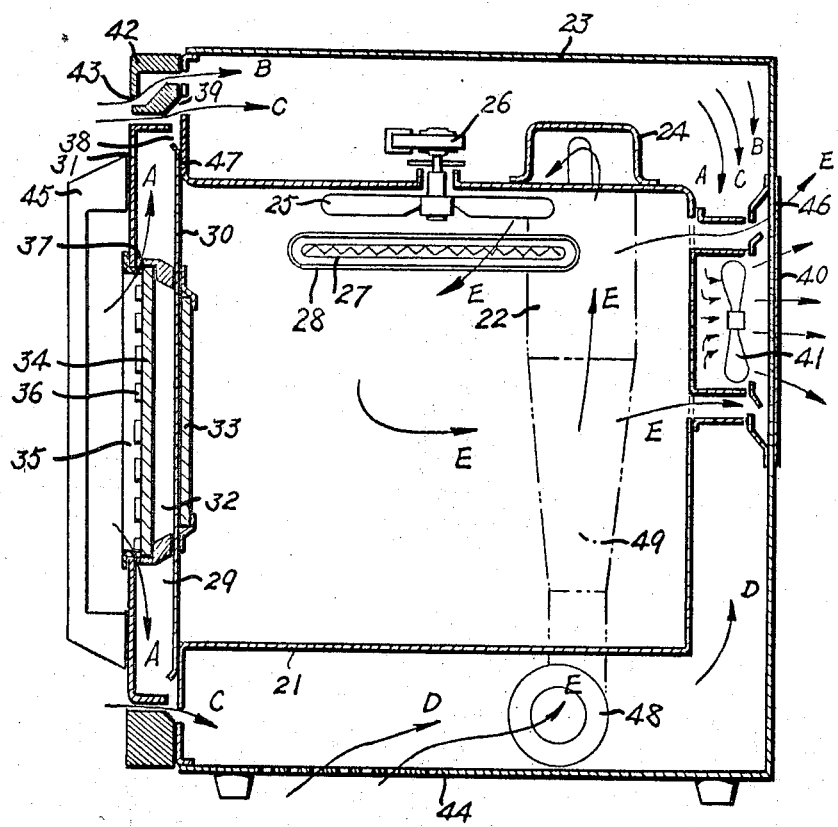
FIG. 2 is a sectional view in vertical section showing another embodiment of this invention.

Turning now to FIG. 2 of the drawings, there is illustrated a device for introducing microwave energy to the enclosure or oven compartment 21 for heating the foodstuff therein which is preferably a magnetron 22. The magnetron 22 is disposed between the oven compartment 21 and the cabinet 23 enclosing the oven compartment 21, and is connected with one end of the wave guide 24 with an antenna or a coaxial output connector. Thus, the foodstuff within the oven compartment 21 is cooked by dielectric heating induced by high frequency microwaves which are introduced into the oven compartment through the wave guide 24.

A metallic stirrer fan 25 is rotatably suspended from the upper wall of the oven compartment 21. The function of the stirrer fan 25 is to spread the radiant energy passing through the wave guide 24 substantially evenly around the periphery of the interior of the oven. The stirrer fan 25 is driven by a motor 26. Furthermore, a resistor type heater 27 is suspended from the upper wall of the oven compartment 21 and arranged to brown the surface of the foodstuff within the oven compartment 21 by means of the radiant heat therefrom. The browning means 27 is enclosed within a covering 28 of wire net or the like, which is operative to shield the browning means 21 from the microwave electric fields.

A hinge (not shown) is secured to a portion of the cabinet 23 and to a door 29 to permit the door 29 to be selectively opened and closed to facilitate the entry and withdrawal of the foodstuff into the oven compartment 21. The door 29 is a hollow frame having an inner wall 30 and an outer wall 31 and further having a window 32 permitting visual inspection of the contents of the oven compartment 21. The inner wall 30 consists of a metallic sheet, and at least a portion thereof corresponding to the window 32 is punched or perforated in a manner to prevent radiation from escaping from the oven compartment 21 through the window 32 and further is covered with a screen glass 33 which serves to prevent cooking odors and other vapors created during the cooking process to be expelled through the window 32. A second screen glass 34 is fitted to the outer wall 31 of the door 29 at a location corresponding to the above screen glass 33 by means of a supporting frame 34 having a L-shape section.

The supporting frame 34 has a plurality of holes 36 to aspirate air from the surrounding ambience. The inside periphery of the outer wall 31 also has a plurality of first apertures 37 cooperating with the holes 36 and defining an inhale end for the path of an air stream through the interior of the door 29. Moreover, the outside periphery of the inner wall 30 of the door 29 is cut to provide a second aperture 38 defining an exhaust end for the path of an air stream through the interior of the door 29. The second aperture 38 communicates with a third aperture 39 defining an inhale end for the path between the oven compartment 21 and the cabinet 23. A rear wall of the cabinet 23 is provided with a plurality of fourth apertures 40 defining an exhaust end for the path between the oven compartment 21 and the cabinet 23. A blower unit 41 having a motor and fan blades is supported in front of the fourth appertures 40.

An ornamental panel 42 is secured to the flange end of the oven compartment 21 in spaced relation against the periphery of the door construction and is provided with a fifth aperture 43 defining another inhale end for the path of an air stream through the exterior of the oven compartment 21. The bottom wall of the cabinet 23 also is provided with a plurality of sixth apertures 44 defining further another inhale end for the path of an air stream. A handle 45 is secured to the outer or front wall of the door 29.

The blower unit 41 is actuated during the cooking process. The air moved by the blower 41 flows through the interior of the door 29 through the apertures 36, 37, and moves air along the door walls 30, 31 and into the exterior of the oven compartment 21 through the aligned apertures 38, 39. The outside air also is drawn into the exterior of the oven compartment 21 through the space between the ornamental frame 42 and the periphery of the door 29, the aperture 43 within the ornamental frame 42 and the aperture 44 in the bottom wall. The air streams A, B, C flow together along the oven walls, cooling simultaneously the interior of the door 29 and the exterior of the oven compartment 21. The air streams A, B, C and D are permitted to escape from the exterior of the oven compartment 21 through the rear apertures 40, which is closed by an overlapping screen 46 blocking the escape of microwave energy therefrom. In the case where the foodstuff is heated by dielectric heating alone, the blower 41 may be stopped.

It will be noted that the door 29 is provided with a seal or metallic contact 47 for preventing the egress of microwave energy from the oven compartment 21. The top and bottom of the door 29 extend beyond the seal means 47 between the door 29 and the entrance to the oven compartment 21 for assuring that there is no escape of the microwave energy. The apertures 37 are sufficiently small as to prevent any radiation which manages to leak between the door 29 and the entrance to the oven compartment 21.

The magnetron 22 is preferably of the air-cooled type having a plurality of fins, and a stream of cooling air E is forced past the radiating fins by a blower unit 48 having a motor and fan blades through a duct 49. The cooling unit 48 cools the magnetron 22 and ventilates the interior of the oven compartment 21, thereby preventing build-up of undesirable condensation in the oven compartment 21.

Figure 3:
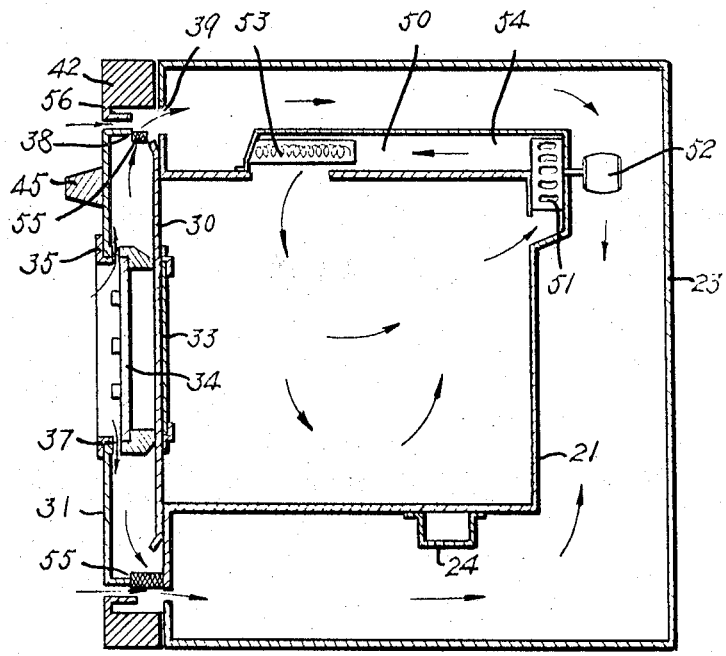
FIG. 3 is a sectional view in horizontal section showing still another embodiment.

In FIG. 3 there is illustrated another type of a microwave oven wherein a hot air blast source is provided for surface browning of the foodstuff. The hot blast type browning means 50 generally comprises fanblades 51, a motor 52, a heater 53 and a duct 54. The one end of the duct 54 is connected to the side wall of the oven compartment 21 and the other end thereof being connected to the rear wall of the oven compartment 21 and thereby establishing the circulation path for an air stream. The browning means 50 aspirates air from the oven compartment 21 and the air stream flows along the duct 50 and then is heated by the heater 53 to produce hot air for surface browning. At this time the cooling air stream passing over the interior of the door 29 cools effectively the browning unit 50 as well as the oven walls.

The aperture 38 in the door 29 may be provided with gasket member 55 substantially impervious to microwave energy and capable of transmitting the cooling air. Otherwise, the inhale end for the cooling air path is provided with 1/4 wavelength choke 56.

Although the description of this invention has been made with a certain degree of particularity, it is understood that the present disclosure has been made only by way of example and that numerous changes in the details of construction and the combination and arrangement of the parts and elements may be resorted to without departing from the spirit and scope of this invention.

I claim:

1. A heating apparatus comprising an enclosure having an access opening therein to receive an article to be heated, a cabinet surrounding said enclosure in spaced relation thereto having an opening adjacent said access opening and having an exhaust opening, a hollow frame door having an outer wall and an inner wall fitted to said enclosure to freely open and close said access opening, said inner wall having a centrally located area having multiple perforations, a window overlying said centrally located perforated area, said outer wall having a centrally located opening in spaced relation with said window, an exhaust aperture near the periphery of said inner wall, an air flow path defined by said centrally located opening in said outer wall, the interior of said hollow door, said exhaust aperture near the periphery of said inner wall in communication with said space between said cabinet and enclosure when said door is closed, and said exhaust opening in said cabinet, a source of high frequency electro magnetic waves in communication with the interior of said enclosure, a metal to metal seal between said door and said enclosure to seal against energy loss from said enclosure through said access opening, and a fan disposed in said exhaust opening in said cabinet for moving air along said air flow path 2. A heating apparatus as in claim 2 together with an additional window disposed in said centrally located opening in said outer wall, said outer wall having a plurality of openings surrounding said additional window in communication with the interior of said hollow door for providing said centrally located opening in said outer wall.

3. A microwave cooking apparatus comprising a metallic oven having an access opening therein to receive the foodstuff to be cooked, a cabinet surrounding said oven in spaced relation thereto having an access opening overlying said access opening in said oven and having an exhaust opening, a hollow metallic door having an inner and outer wall in spaced relation fitted to said enclosure to freely open and close said access opening, said inner wall having a perforated area centrally located which bars microwave energy, said outer wall having a centrally located opening in juxtaposition with said perforated area, a screen glass member secured overlying said perforated area for barring cooking vapors, a plurality of outlet apertures through the periphery of said inner wall, a source of high frequency electromagnetic waves in communication with the interior of said oven, a metal to metal seal between said door and said oven surrounding said access opening to seal against energy loss from said oven through said access opening, radiant heating means for surface browning of the food stuffs, an air flow path extending from said centrally located opening in said door through the interior of said door through the outlet apertures at the periphery of said door into the space between said oven and said cabinet and through said exhaust aperture in said cabinet, and a blower for moving cooling air through said air flow path, said blower serving to prevent temperature rise of said outer wall due to the heat from said radiant heating means.

4. A microwave cooking apparatus comprising a metallic oven having an access opening therein to receive the foodstuff to be cooked, a cabinet surrounding said oven in spaced relation thereto having a front access opening overlying said access opening in said oven and an exhaust opening, a hollow metallic door having an inner wall and an outer wall fitted to said oven to freely open and close said access opening, said inner wall having a perforated area centrally located which bars microwave energy, said outer wall having a centrally located window opening overlying said perforated area in said inner wall, first and second screen glass members secured overlying said perforated area in said inner wall and said opening in said outer wall respectively for barring cooking vapors, a plurality of inlet apertures surrounding said second screen glass in communication with the interior of said door, a plurality of exhaust apertures through the periphery of said inner wall, a source of high frequency electromagnetic waves in communication with the interior of said oven, browning means for surface browning of the foodstuff, an air-flow path defined by said inlet apertures in said hollow door, the interior of said door, said exhaust apertures in said door, said space between said oven and said cabinet, and said exhaust aperture in said cabinet, a metal to metal seal between said door and said oven to seal against energy loss from said oven through said access opening, a seal mounted in said exhaust apertures in said hollow door substantially impervious to microwave energy and capable of transmitting air, and a fan disposed in said exhaust aperture in said cabinet for moving air through said air flow path, thereby cooling said outer wall of said hollow door and said cabinet.

* * * * *